United States Patent
Stakem et al.

(10) Patent No.: US 8,420,733 B2
(45) Date of Patent: Apr. 16, 2013

(54) CONTINUITY ADDITIVES AND THEIR USE IN POLYMERIZATION PROCESSES

(75) Inventors: F. Gregory Stakem, Flemington, NJ (US); Agapios K. Agapiou, Humble, TX (US); F. David Hussein, Cross Lanes, WV (US)

(73) Assignee: Univation Technologies, LLC, Houston, TX (US)

( * ) Notice: Subject to any disclaimer, the term of this patent is extended or adjusted under 35 U.S.C. 154(b) by 129 days.

(21) Appl. No.: 12/673,561

(22) PCT Filed: Aug. 6, 2008

(86) PCT No.: PCT/US2008/009435
§ 371 (c)(1),
(2), (4) Date: Feb. 15, 2010

(87) PCT Pub. No.: WO2009/023111
PCT Pub. Date: Feb. 19, 2009

(65) Prior Publication Data
US 2011/0184124 A1 Jul. 28, 2011

Related U.S. Application Data

(60) Provisional application No. 60/964,925, filed on Aug. 16, 2007.

(51) Int. Cl.
| | | |
|---|---|---|
| C08F 2/44 | (2006.01) | |
| C08F 4/06 | (2006.01) | |
| C08F 4/44 | (2006.01) | |
| C08F 4/60 | (2006.01) | |
| C07F 5/06 | (2006.01) | |
| B01J 31/00 | (2006.01) | |

(52) U.S. Cl.
USPC ........... 524/773; 556/170; 526/154; 526/155; 526/160; 502/132; 502/152; 502/154

(58) Field of Classification Search ................... 524/773; 556/170; 526/154, 155, 160; 502/132, 152, 502/154
See application file for complete search history.

(56) References Cited

U.S. PATENT DOCUMENTS

| | | | |
|---|---|---|---|
| 4,012,574 A | 3/1977 | Jones et al. | 526/74 |
| 5,034,480 A | 7/1991 | Funk et al. | 526/74 |
| 5,034,481 A | 7/1991 | Funk et al. | 526/74 |
| 5,066,736 A | 11/1991 | Dumain et al. | 526/82 |

(Continued)

FOREIGN PATENT DOCUMENTS

| | | |
|---|---|---|
| EP | 0453116 | 10/1991 |
| EP | 0549252 | 6/1993 |

(Continued)

*Primary Examiner* — William Cheung
(74) *Attorney, Agent, or Firm* — Kristina Leavitt; Jennifer A. Schmidt; Leandro Arechederra, III

(57) ABSTRACT

A continuity additive according to one general approach includes a substance having an ability to reduce, prevent, or mitigate at least one of fouling, sheeting, and static level of a material present in a polymerization reactor system when added to the reactor system in an effective amount, with the proviso that the substance is not a polysulfone polymer, a polymeric polyamine, or an oil-soluble sulfonic acid; and a scavenger contacted with the substance, optionally, the scavenger neutralizing water coming in contact therewith. Additional continuity additives, methods of making continuity additives, and use of continuity additives are also presented.

28 Claims, 6 Drawing Sheets

Fig. 1

U.S. PATENT DOCUMENTS

| | | | |
|---|---|---|---|
| 5,126,414 A | 6/1992 | Cooke et al. | 526/68 |
| 5,332,706 A | 7/1994 | Nowlin et al. | 502/107 |
| 5,427,991 A | 6/1995 | Turner | 502/103 |
| 5,461,123 A | 10/1995 | Song et al. | 526/74 |
| 5,473,028 A | 12/1995 | Nowlin et al. | 526/114 |
| 5,492,975 A | 2/1996 | Peifer et al. | 525/274 |
| 5,610,244 A | 3/1997 | Govoni et al. | 526/65 |
| 5,627,243 A | 5/1997 | H am al ainen et al. | 526/68 |
| 5,643,847 A | 7/1997 | Walzer | 502/117 |
| 5,661,095 A | 8/1997 | Meverden et al. | 502/102 |
| 6,306,984 B1 * | 10/2001 | Agapiou et al. | 526/154 |
| 6,608,153 B2 * | 8/2003 | Agapiou et al. | 526/154 |
| 7,205,363 B2 | 4/2007 | Dickey et al. | 426/135 |
| 7,354,880 B2 * | 4/2008 | Agapiou et al. | 502/129 |
| 7,790,816 B2 * | 9/2010 | Markel et al. | 526/67 |
| 7,985,811 B2 * | 7/2011 | Hagerty et al. | 526/60 |
| 2005/0148742 A1 * | 7/2005 | Hagerty et al. | 526/68 |
| 2006/0247396 A1 * | 11/2006 | Blackmon et al. | 526/113 |

FOREIGN PATENT DOCUMENTS

| | | |
|---|---|---|
| EP | 0811638 | 12/1997 |
| WO | WO 96/11961 | 4/1996 |
| WO | WO 97/06186 | 2/1997 |
| WO | WO 97/14721 | 4/1997 |
| WO | WO 97/15602 | 5/1997 |
| WO | WO 97/27224 | 7/1997 |
| WO | WO 97/46599 | 12/1997 |
| WO | WO 00/02930 | 1/2000 |
| WO | WO 2005/003184 | 1/2005 |

* cited by examiner

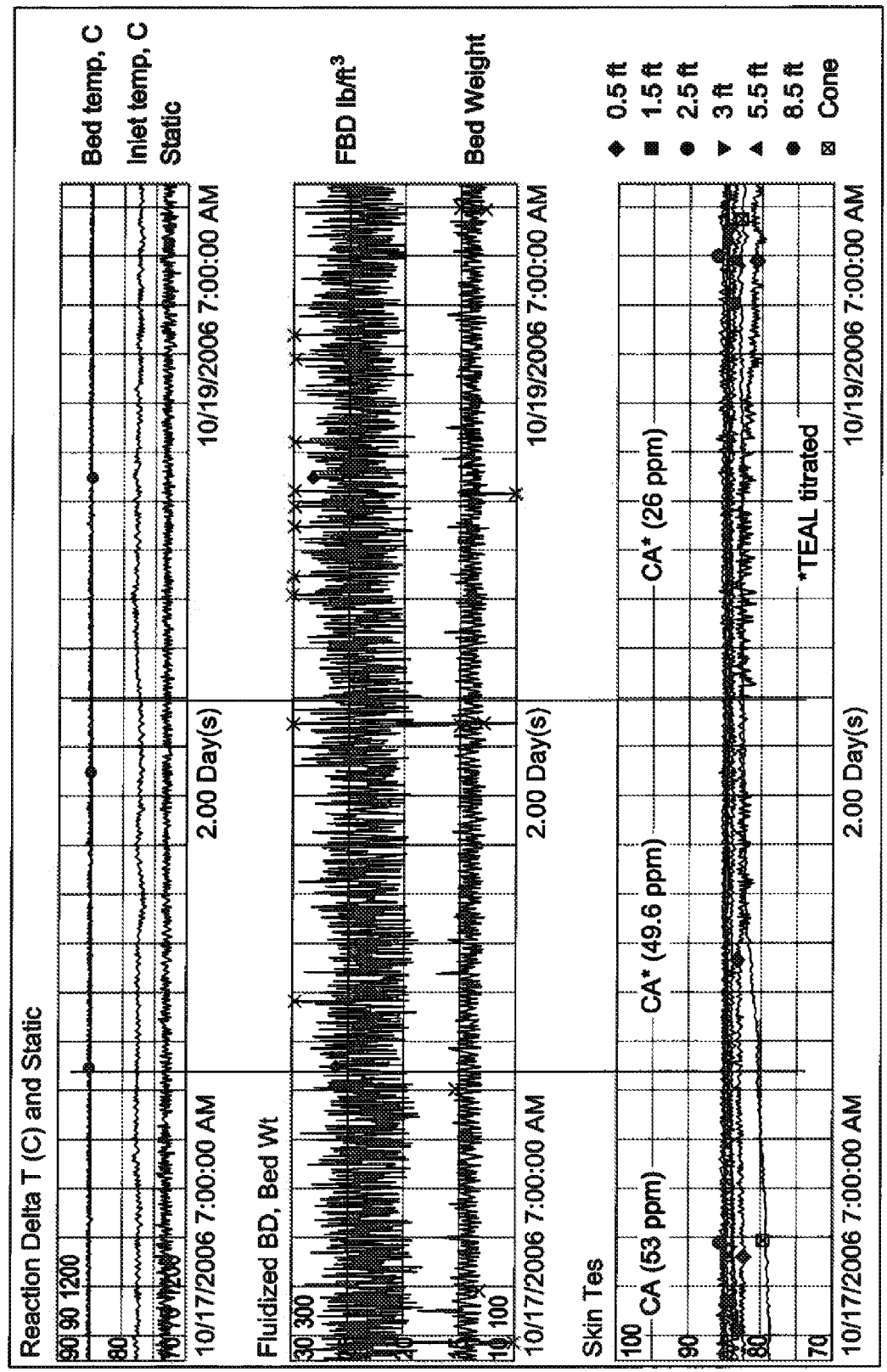
Fig. 7 Operability Trends- XCAT EZ 100 with Titrated and Untitrated Continuity Additive

CONTINUITY ADDITIVES AND THEIR USE IN POLYMERIZATION PROCESSES

CROSS-REFERENCE TO RELATED APPLICATIONS

This application is a National Stage application under 35 U.S.C. §371 of International Application No. PCT/US2008/009435, filed Aug. 6, 2008, that claims the benefit of Ser. No. 60/964,925, filed Aug. 16, 2007, the disclosures of which are incorporated by reference in their entireties.

FIELD OF THE INVENTION

The present invention relates to continuity additives for polyolefin production, and more particularly, this invention relates to continuity additives and use thereof in polymerization processes.

BACKGROUND

Sheeting and chunking has been a problem in commercial polyolefin production reactors for many years. In gas phase reactors, the problem is generally characterized by the formation of solid masses of polymer on the walls of the reactor. These solid masses of polymer (e.g., the sheets) eventually become dislodged from the walls and fall into the reaction section, where they interfere with fluidization, block the product discharge port, plug the distributor plate, and usually force a reactor shut-down for cleaning, any one of which can be termed a "discontinuity event", which in general is a disruption in the continuous operation of a polymerization reactor. The terms "sheeting, chunking and/or fouling" while used synonymously herein, may describe different manifestations of similar problems, in each case they can lead to a reactor discontinuity event.

There are at least two distinct forms of sheeting that occur in gas phase reactors. The two forms (or types) of sheeting are described as wall sheets or dome sheets, depending on where they are formed in the reactor. Wall sheets are formed on the walls (generally vertical sections) of the reaction section. Dome sheets are formed much higher in the reactor, on the conical section of the dome, or on the hemi-spherical head on the top of the reactor (see, e.g., FIG. 4).

When sheeting occurs with Ziegler-Natta catalysts, it generally occurs in the lower section of the reactor and is referred to as wall sheeting. Ziegler-Natta catalysts are capable of forming dome sheets, but the occurrence is rare. However, with metallocene catalysts, sheeting may occur at either location or both: wall sheeting and dome sheeting.

Dome sheeting has been a particularly troublesome with metallocene catalyst systems. Typical metallocene compounds are generally described as metal complexes containing one or more ligands, usually, cyclopentadienyl derived ligands complexed with a transition metal selected from Group 4, 5 or 6 or from the lanthanide and actinide series of the Periodic Table of Elements.

One characteristic that makes it difficult to control sheeting with metallocene catalysts is their unpredictable static tendencies. For instance, EP 0 811 638 A2 describes metallocene catalysts as exhibiting sudden erratic static charge behavior that can appear after long periods of stable behavior.

As a result of the reactor discontinuity problems associated with using metallocene catalysts, various techniques have been proposed to improve reactor operability. U.S. Pat. Nos. 5,332,706 and 5,473,028 disclose a particular technique for forming a catalyst by "incipient impregnation." U.S. Pat. Nos. 5,427,991 and 5,643,847 disclose the chemical bonding of non-coordinating anionic activators to supports. U.S. Pat. No. 5,492,975 discloses polymer bound metallocene catalyst systems. U.S. Pat. No. 5,661,095 discloses supporting a metallocene catalyst on a copolymer of an olefin and an unsaturated silane. WO 97/06186 discloses removing inorganic and organic impurities after formation of the metallocene catalyst itself. WO 97/15602 discloses readily supportable metal complexes. WO 97/27224 discloses forming a supported transition metal compound in the presence of an unsaturated organic compound having at least one terminal double bond. U.S. Pat. No. 7,205,363 and WO 2005/003184 disclose the use of certain continuity additives with metallocene catalysts to improve reactor operability.

Others have discussed different process modifications for improving reactor continuity with metallocene catalysts and conventional Ziegler-Natta catalysts. For example, WO 97/14721 discloses the suppression of fines that can cause sheeting by adding an inert hydrocarbon to the reactor. U.S. Pat. No. 5,627,243 discloses a distributor plate for use in fluidized bed gas phase reactors. WO 96/08520 discloses avoiding the introduction of a scavenger into the reactor. U.S. Pat. No. 5,461,123, discloses using sound waves to reduce sheeting. U.S. Pat. No. 5,066,736, and EP-A1 0 549 252, disclose the introduction of an activity retarder to the reactor to reduce agglomerates. U.S. Pat. No. 5,610,244, discloses feeding make-up monomer directly into the reactor above the bed to avoid fouling and improve polymer quality. U.S. Pat. No. 5,126,414, discloses including an oligomer removal system for reducing distributor plate fouling and providing for polymers free of gels. There are various other known methods for improving operability including coating the polymerization equipment, controlling the polymerization rate, particularly on start-up, and reconfiguring the reactor design and injecting various agents into the reactor.

With respect to injecting various agents into the reactor, the use of antistatic agents as process "continuity additives" appear to hold promise and have been the subject of various publications. For example, EP 0 453 116 A1, discloses the introduction of antistatic agents to the reactor for reducing the amount of sheets and agglomerates. U.S. Pat. No. 4,012,574, discloses adding a surface-active compound having a perfluorocarbon group to the reactor to reduce fouling. WO 96/11961, discloses an antistatic agent for reducing fouling and sheeting in a gas, slurry or liquid pool polymerization process as a component of a supported catalyst system. U.S. Pat. Nos. 5,034,480 and 5,034,481, disclose a reaction product of a conventional Ziegler-Natta titanium catalyst with an antistatic agent to produce ultrahigh molecular weight ethylene polymers. For example, WO 97/46599, discloses the use of soluble metallocene catalysts in a gas phase process utilizing soluble metallocene catalysts that are fed into a lean zone in a polymerization reactor to produce stereoregular polymers. WO 97/46599 also discloses that the catalyst feedstream can contain antifoulants or antistatic agents such as ATMER® 163 (commercially available from ICI Specialty Chemicals, Baltimore, Md.). See also U.S. Pat. No. 7,205,363 and WO 2005/003184.

However, adding continuity additives to the reactor has been observed to sometimes result in reduced catalyst productivity.

SUMMARY

The present invention is broadly directed to various continuity additives and methods of making such continuity additives. The invention is also broadly directed to various systems and methods that may use such continuity additives.

A continuity additive according to one general approach includes a substance characterized by an ability to reduce at least one of fouling, sheeting, and static level of a material present in a polymerization reactor system when introduced to the reactor system in an effective amount, with the proviso that the substance is not a polysulfone polymer, a polymeric polyamine, or an oil-soluble sulfonic acid; and a scavenger mixed with the substance, optionally, the scavenger neutralizing water coming in contact therewith.

A continuity additive according to another general approach includes a substance characterized by an ability to reduce at least one of fouling, sheeting, and static level of a material present in a polymerization reactor system when introduced to the reactor system in an effective amount; and a scavenger mixed with the substance, optionally, the scavenger neutralizing water coming in contact therewith, wherein the scavenger is present in an amount from about 0.25 to about 5.0 mole of scavenger per mole of water in the continuity additive.

A method for making a continuity additive according to one general approach includes contacting a scavenger with a substantially nonaqueous carrier, the scavenger neutralizing water coming in contact therewith, wherein the continuity additive also includes a substance, the substance being characterized by an ability to reduce at least one of fouling, sheeting, and static level of a material present in a polymerization reactor system when introduced to the reactor system in an effective amount.

A polymerization process according to another general approach includes contacting: a catalyst system; at least one monomer; and at least one continuity additive; in a reactor system under polymerization conditions, wherein the continuity additive compresses a scavenger, optionally, neutralizing water in the continuity additive; wherein the continuity additive is characterized by an ability to reduce, prevent, or mitigate at least one of fouling, sheeting, and static level of a material present in a polymerization reactor system when added to the reactor system in an effective amount, with the proviso that the continuity additive does not include an effective amount of a polysulfone polymer, a polymeric polyamine, or an oil-soluble sulfonic acid.

A process for introducing at least one continuity additive into a reactor system in an amount that reduces, prevents, or mitigates sheeting or fouling of polymer produced by a polymerization reaction of at least one olefin, wherein the polymerization reaction is conducted in the reactor system, the reactor system comprising a fluidized bed reactor, an entrainment zone, a catalyst feed for introducing a catalyst system capable of producing the polymer, at least one continuity additive feed for introducing the at least one continuity additive independently of the catalyst mixture, a mechanism for monitoring a level of electrostatic activity in the reactor system, the process according to one general approach includes contacting the at least one olefin with the catalyst system under polymerization conditions in the fluidized bed reactor; introducing the at least one continuity additive into the reactor system at a time before, during, or after start of the polymerization reaction, wherein the continuity additive includes a scavenger, optionally, neutralizing water in the continuity additive; monitoring the levels of electrostatic activity in the entrainment zone; and adjusting the amount of the at least one continuity additive introduced into the reactor system to maintain the level of electrostatic activity in the reactor system at or below a predetermined level.

BRIEF DESCRIPTION OF THE DRAWINGS

FIG. 7 is a chart illustrating the operability trends of a polymerization process performed in the presence of a continuity additive with and without scavenger added thereto.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

The present invention is generally directed toward improved continuity additives and methods of making and using such continuity additives in polymerization processes.

A continuity additive according to one embodiment of the present invention may be described generally as including a substance characterized by an ability to reduce at least one of fouling, sheeting, and static level of a material present in a polymerization reactor system when introduced to the reactor system in an effective amount, with the proviso that the substance is not a polysulfone polymer, a polymeric polyamine, or an oil-soluble sulfonic acid; and a scavenger mixed with the substance, optionally, the scavenger neutralizing water coming in contact therewith.

A continuity additive according to another embodiment of the present invention may be described generally as including a substance characterized by an ability to reduce, prevent, or mitigate at least one of fouling, sheeting, and static level of a material present in a polymerization reactor system when introduced to the reactor system in an effective amount, and a scavenger mixed with the substance, optionally, the scavenger neutralizing water coming in contact therewith. The scavenger may be present in an amount of between about 0.25 and about 5.0 mole of scavenger per mole of water in the continuity additive, preferably, as measured prior to addition of the scavenger thereto.

Figure 1:
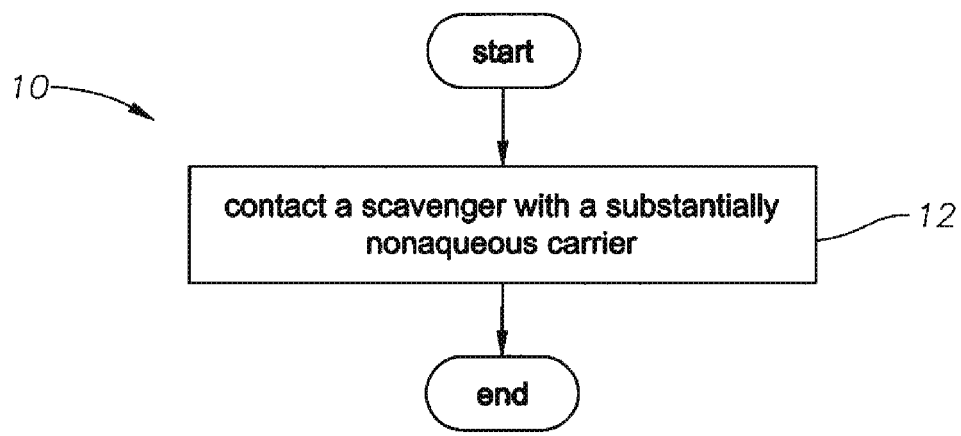
FIG. 1 is a schematic representation of the general methods, systems, and/or apparatuses of certain embodiments of the invention.

A general method 10 for making a continuity additive may be described, for example, with reference to FIG. 1, in which a scavenger is contacted with a substantially nonaqueous carrier such as an oil, hydrocarbon, etc. in operation 12, the scavenger neutralizing water coming in contact therewith.

Nonaqueous as used here includes any liquid substantially free of water. For example, substantially free of water is any liquid carrier containing 250 ppm of water or less, alternatively, 100 ppm of water or less, alternatively, alternatively, 50 ppm of water or less, alternatively, 25 ppm of water or less, alternatively, 5 ppm of water or less, and, alternatively, 1 ppm of water or less. Is some embodiments, nonaqueous as used herein refers to any liquid having no water.

The nonaqueous liquid carrier should generally be able to be slurried with catalyst components and/or continuity additives or other additives for transport to the reactor system. Typically, the nonaqueous liquid carrier is mineral oil. Mineral oil is a liquid petroleum derivative. It is generally, for example, made of alkanes (typically, $C_{15}$ to $C_{40}$) and cyclic paraffins. However, any hydrocarbon liquid or other suitable liquid should generally have application with the embodiments described herein.

The finished continuity additive also includes a substance, the substance being characterized by an ability to reduce at least one of fouling, sheeting, and static level of a material present in a polymerization reactor system when introduced to the reactor system in an effective amount.

Figure 2:
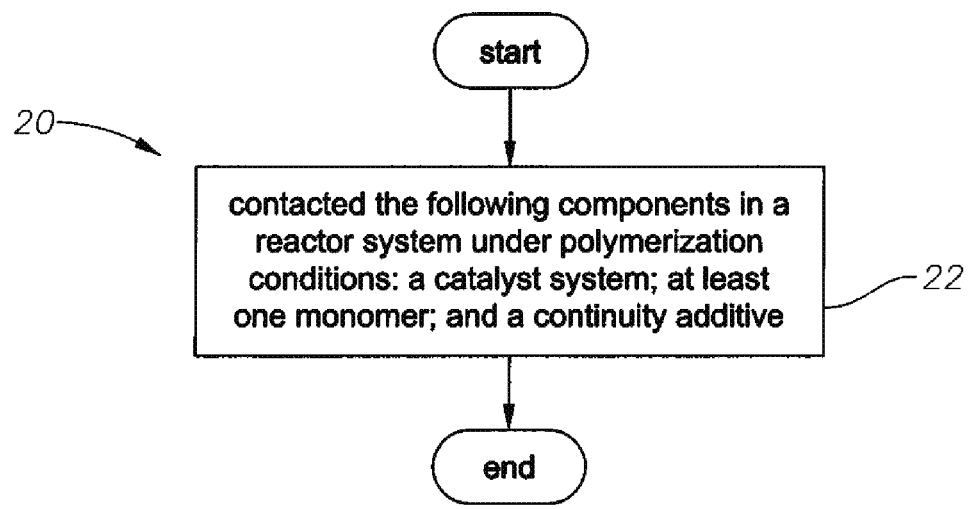
FIG. 2 is a schematic representation of the general methods, systems, and/or apparatuses of certain embodiments of the invention.

A general polymerization process 20 may be described, for example, with reference to FIG. 2, in which the following components are contacted in a reactor system under polymerization conditions in operation 22: a catalyst system; at least one monomer; and at least one continuity additive. The continuity additive may include a scavenger neutralizing water in the continuity additive. Preferably, the continuity additive is characterized by an ability to reduce at least one of fouling, sheeting, and static level of a material present in a polymerization reactor system when introduced to the reactor system in an effective amount, with the proviso that the continuity additive does not include an effective amount of a polysulfone polymer, a polymeric polyamine, or an oil-soluble sulfonic acid.

Figure 3:
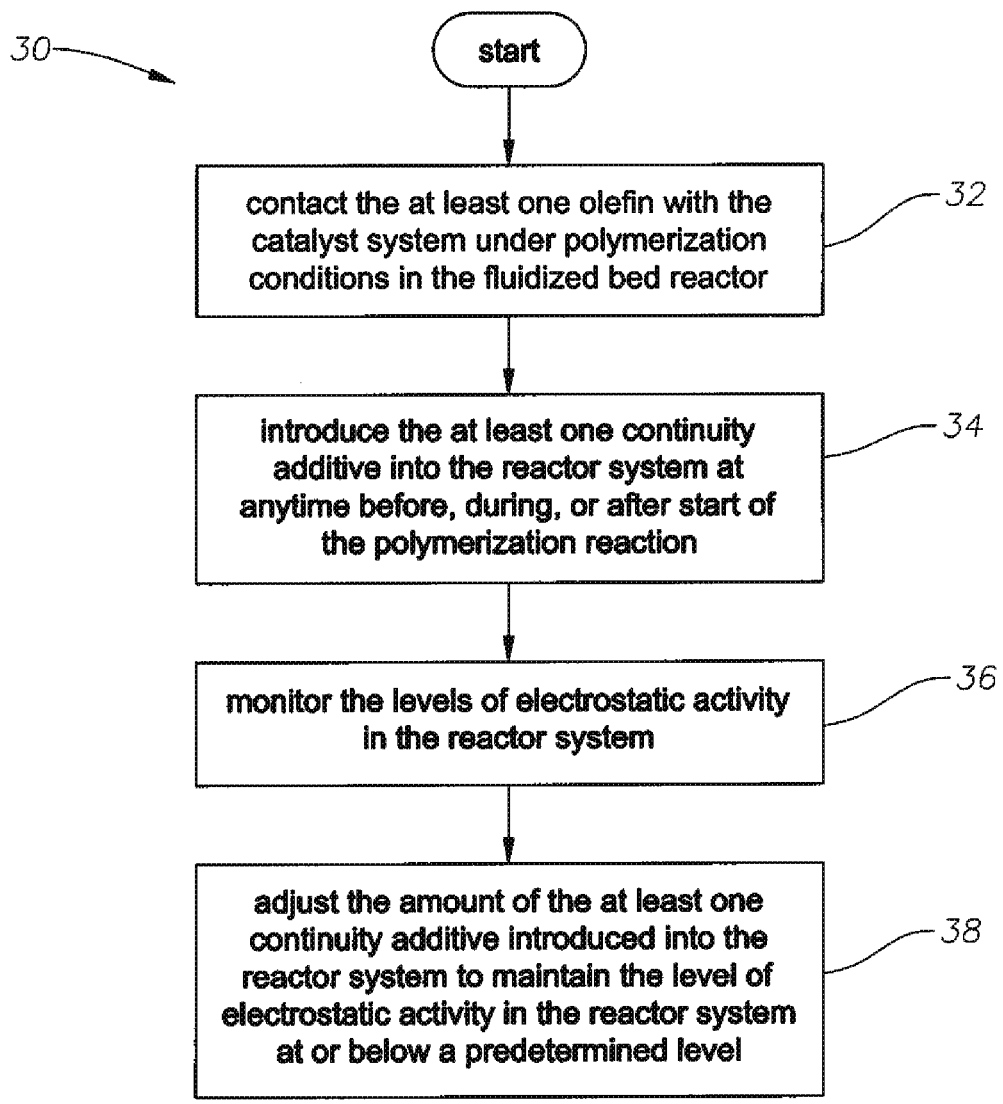
FIG. 3 is a schematic representation of the general methods, systems, and/or apparatuses of certain embodiments of the invention.

A general process 30 for introducing at least one continuity additive into a reactor system in an amount that prevents or reverses sheeting or fouling of polymer produced by a polymerization reaction of at least one olefin can be described, for example, with reference to FIG. 3, wherein the polymerization reaction is conducted in the reactor system, the reactor system comprising a fluidized bed reactor, a catalyst feed for introducing a catalyst system capable of producing the polymer, at least one continuity additive feed for introducing the at least one continuity additive independently of the catalyst mixture, a mechanism for monitoring a level of electrostatic activity in the reactor system. In operation 32, the at least one olefin is contacted with the catalyst system under polymerization conditions in the fluidized bed reactor. In operation 34, the at least one continuity additive is introduced into the reactor system at a time before, during, or after start of the polymerization reaction, wherein the continuity additive includes a scavenger neutralizing water in the continuity additive. In operation 36, the levels of electrostatic activity in the reactor system are monitored. In operation 38, the amount of the at least one continuity additive introduced into the reactor system is adjusted to maintain the level of electrostatic activity in the reactor system at or below a predetermined level.

Further details of continuity additives and methods of making and using the same, including specific apparatuses adapted therefore, are described below, and each of the below-described details are specifically considered in various combination with these and other generally preferred approaches described herein.

While the present invention is applicable to gas phase polyolefin production, the broad concepts and teachings herein also have applicability to many types of processes, including but not limited to, gas phase, gas/solid phase, liquid/solid phase, gas/liquid phase, and gas/liquid/solid phase catalyst reactor systems including polymerized catalyst reactor systems; gas phase, gas/solid phase, liquid/solid phase, gas/liquid phase, and gas/liquid/solid phase batch charge preparation systems; etc.

For ease of understanding of the reader, as well as to place the various embodiments of the invention in a context, much of the following description shall be presented in terms of a commercial, gas phase polyethylene production system. It should be kept in mind that this is done by way of non-limiting example only.

Thus, the continuity additives creatable using the materials and methods described herein are useful in any reaction process, including polymerization processes such as gas phase, solution, slurry, and high pressure processes. The invention in one aspect creates a continuity additive(s) that results in better reactor operability by reducing sheeting and/or fouling with minimal impact on catalyst productivity or improved catalyst activity as compared to conventional techniques.

Continuity Additives

A continuity additive or at least one continuity additive in some embodiments is an agent (or additive or adjunct) that is introduced to an olefin polymerization reaction process to alter the reaction, e.g., prevent sheeting, reduce friction, etc. In any of the embodiments described herein, the continuity additive may comprise two or more compounds or agents as described below. The agent may be in the form of a slurry or suspension that, in addition to a traditional active substance, also optionally, includes some type of scavenger that has been added to the agent, for example, to neutralize the water therein. As use herein, "neutralize" refers to ability of the scavenger to react with catalyst poisons, such as water, so that the catalyst productivity is not adversely effected. "Adversely effected" as used here refers to a loss of 1% or more, alternatively, 5% or more, alternatively, 10% or more, alternatively, 15% or more, alternatively, 20% or more, alternatively, 25% or more, and, alternatively, 30% or more of catalyst productivity as measured from a predetermined level.

The agent is typically called a continuity additive because it promotes a continuous reaction process by preventing discontinuity events such as sheeting, chunking, etc. Synonyms for continuity additives include antistatic agents, anti fouling agents, and sheeting preventing agents.

A continuity additive according to one preferred embodiment includes a substance characterized by an ability to reduce, prevent, or mitigate at least one of fouling, sheeting, and static level of a material present in a polymerization reactor system when introduced to the reactor system in an effective amount. A scavenger is mixed with the substance, the scavenger neutralizing water coming in contact therewith.

A continuity additive according to another preferred embodiment includes a substance characterized by an ability to reduce, prevent, or mitigate the effects of at least one of fouling, sheeting, and static level of a material present in a polymerization reactor system when introduced to the reactor system in an effective amount. A scavenger may be contacted with the continuity additive, the scavenger neutralizing water coming in contact therewith. The scavenger may be present in an amount of between about 0.25 and about 5.0 mole of scavenger per mole of water in the continuity additive, preferably as measured prior to addition of the scavenger thereto. Note that higher and lower amounts of scavenger may be added. In a class of embodiments, the amount of scavenger contacted with the carrier is in an amount of between about 0.5 and about 2.5 mole of scavenger per mole of water measured. In another class of embodiments, the amount of scavenger contacted with the carrier is in an amount of from about 0.8 to about 1.50 mole of scavenger per mole of water measured.

In certain embodiments, the amount of scavenger present is not more than about that needed to neutralize the water in the continuity additive so as to minimize any potential interference of the scavenger with the active substance in the continuity additive and/or with the reaction in the reactor system.

In a typical embodiment, where a scavenger is introduced in the amounts presented above, a continuity additive with scavenger has less effect on catalyst productivity than an otherwise identical continuity additive not containing a scavenger. As seen in Example 1, below, experimental results even show an improvement in catalyst productivity (of XCAT™ EZ 100 metallocene catalyst (available from Univation Technologies, Houston, Tex., USA)) of 15-30% by using aluminum distearate continuity additive with scavenger added at 1.25 mole of alkyl scavenger per mole of water in the continuity additive in comparison to the same continuity additive without scavenger present. Similar results may be expected for various combinations of the materials presented herein.

Experimental results also show that a continuity additive with scavenger is about as effective in mitigating a discontinuity event as an otherwise identical continuity additive not containing a scavenger.

In a class of embodiments, suitable continuity additives for use in the various embodiments of the present invention may comprise one or more compounds selected from alkoxylated amines and carboxylic acid salts.

Ethoxylated stearyl amines are commercially available from ICI and its affiliates, and supplied under the trade name ATMER 163. Another active substance is commercially available from Ciba Chemical Company and supplied under the trade name AS 990.

Others include aluminum stearate, aluminum distearate, aluminum oleate, and oxol aluminum stearate. Still others supplied commercially under the trade names OCTASTAT and STADIS and may be described in U.S. Pat. No. 5,026,795, available from Octel Starreon also known as Innospec Inc.

In other embodiments, the continuity additive may comprise polysulfones, polymeric polyamines, and (optionally oil-soluble) sulfonic acids.

In another class of embodiments, the continuity additive may comprise a mixture of two or more of the above-discussed materials. Such mixtures may include: alkoxylated amines and carboxylic acid salts; or alkoxylated amines and polysulfones; or alkoxylated amines and polymeric polyamines; or alkoxylated amines and sulfonic acids; or carboxylic acid salts and polysulfones; or carboxylic acid salts and polymeric polyamines; or carboxylic acid salts and sulfonic acids; or polysulfones and polymeric polyamines; or polysulfones and sulfonic acids; or polymeric polyamines and sulfonic acids. Additionally contemplated are alkoxylated amines, carboxylic acid salts and polysulfones; or alkoxylated amines, polymeric polyamines and sulfonic acids; or carboxylic acid salts, polysulfones and polymeric polyamines; or carboxylic acid salts, sulfonic acids and polysulfones; alkoxylated amines, carboxylic acid salts and polymeric polyamines; alkoxylated amines, carboxylic acid salts and sulfonic acids; alkoxylated amines, polysulfones and sulfonic acids; alkoxylated amines, polymeric polyamines and polysulfones; polysulfones, polymeric polyamines and sulfonic acids; carboxylic acid salts, polymeric polyamines and sulfonic acids. Combinations of three or four or more of these continuity additives are also contemplated. These combinations may be combined at ratios of from 10:90 to 90:10, or 25:75 to 75:25, or 40:60 to 60:40, or 50:50, or in the case of three continuity additives, 10:10:80 to 80:10:10 or 10:80:10.

Another continuity additive for use in embodiments of the present invention comprises a mixture of 1 decene-polysulfone present in a concentration of 5-15 percent by weight of the mixture, a reaction product of N-tallow-1,3-diaminopropane and epichlorohydrin present in a concentration of 5-15 percent by weight of the mixture, dodecylbenzenesulfonic acid present in a concentration of 5-15 percent by weight of the mixture, and a hydrocarbon solvent in a concentration of 60-88 percent by weight of the mixture, this mixture is commercially available from Octel Starreon and its affiliates under the tradename OCTASTAT 3000 (which may also be available as STADIS 450) or OCTASTAT 2000 (which may also be available as STADIS 425), each of which may have a different percentage makeup than that discussed immediately above.

In a class of embodiments, conventional metallocene catalysts are known to be sensitive to wall and expanded section sheeting. A particularly preferred continuity additive for use with metallocene catalysts includes aluminum distearate, which is fed to the reactor as slurry continuously and separately from the catalyst to mitigate, for example, wall and expanded section sheeting.

The scavenger as used herein may be any water scavenging compound capable of neutralizing water. The various scavengers may use any mechanism of neutralizing water, such as forming a complex with the water, reacting with the water, etc.

In a class of embodiments, a "scavenger" is any organometallic compound which is reactive towards oxygen and/or water and/or polar compounds and which does not include the catalyst components, for example, the metallocene catalyst component, the activator, the optional carrier or the components remaining in or on the catalyst used in its preparation, for example toluene including any organometallic compounds used in the catalyst preparation. Non-limiting examples of scavenger compounds are those represented by the general formula $R_n M$, where M is a Group 12 or 13 element, each R, which can be the same or different, is a substituted or unsubstituted, straight or branched chain alkyl radical, cyclic hydrocarbyl, alkyl-cyclohydrocarbyl radical, aromatic radical, or alkoxide radical, wherein n is 2 or 3.

In another embodiment, the scavenger may be a hydrocarbon aluminum compound of the formula $AlR_{(3-a)}X_a$ where R is alkyl, cycloalkyl, aryl or a hydride radical. Each alkyl radical may be straight or branched chain having from 1 to 20 carbon atoms, alternatively, 1 to 10 carbon atoms. X is a halogen or hydride for example chlorine, bromine or iodine, chlorine is preferred; a is 0, 1 or 2.

Illustrative, but non-limiting examples of such compounds of the above formula can include when M is aluminum (Al), the trialkyl aluminums such as trimethyl aluminum, triethyl aluminum, tri-n-propyl aluminum, tri-isopropyl aluminum, tri-n-butyl aluminum, tri-sec-butyl aluminum, tri-t-butyl aluminum, tri-isobutyl aluminum, tri-n-pentyl aluminum, tricyclopentyl aluminum, tri-n-hexyl aluminum, tri-(4-methylpentyl) aluminum, tri-(3-methylpentyl) aluminum, tricyclohexyl aluminum, and the like; alkyl aluminums such as dimethylethyl aluminum, methyldiethyl aluminum, ethyldimethyl aluminum, dimethyl-n-propyl aluminum, methyl di-n-propyl aluminum, dimethylisopropyl aluminum, dimethylcyclohexyl aluminum, methylethylpropyl aluminum, and the like, aryl and alkyl-substituted aluminums, such as triphenyl aluminum, tri-p-tolyl aluminum, tri-m-tolyl aluminum, tri-p-ethyl aluminum, and the like. Other non-limiting examples of typical scavengers include dialkyl aluminum halides, for instance diethylaluminum chlorides, ethyl aluminum dichlorides, bromides and iodides and dialkyl aluminum sesquichlorides, bromides and iodides; aluminum alkoxides and aryloxides such as dimethyl aluminum methoxide, dimethyl aluminum ethoxide, diethyl aluminum ethoxide, diethyl aluminum isopropoxide, methyl ethyl aluminum methoxide, dimethyl aluminum 4-methylphenoxide, demethyl aluminum 3-methylphenoxide, dimethyl aluminum 2,6-diisopropylphenoxide, dimethyl aluminum 2,6-di-t-butyl-4-methylphenoxide, and the like.

A similar list of illustrative Group 13 element compounds where M is boron may be made for the trialkyl boranes, alkyl boranes, and alkyl borane alkoxides. Also a similar list could be given for the analogous compounds of gallium and indium. Such list would be nearly identical to that already presented with respect to the aluminum species and therefore such listing of the borane analogues and other Group 13 elements analogues are not necessary to a complete disclosure.

Scavengers typically preferred are those in the above formula wherein M is aluminum or boron. Of the aluminum species of Group 13 element compounds, the most often used as scavengers are alkylaluminum compounds, such as trialkylaluminum compounds, the most preferred being triethylaluminum, triisobutyl aluminum, and trimethylaluminum.

Aluminum alkyl compounds may be, for example, triethylaluminum (TEAL), trimethylaluminum (TMAL), tri-isobutylaluminum (TIBAL) and tri-n-hexylaluminum (TNHAL), and diethyl aluminum chloride (DEAC) and the like.

Methods of Making Continuity Additives

In a class of embodiments, a method for making at least one continuity additive includes contacting a scavenger with a substantially nonaqueous carrier, which may be raw carrier, a carrier with adjuncts present, a carrier already mixed with an active substance to thereby form a continuity additive slurry mixture, etc. Without being bound to theory, the scavenger neutralizes water coming in contact therewith. The continuity additive also includes a substance as described above, the substance being characterized by an ability to reduce, prevent, or mitigate at least one of fouling, sheeting, and static level of a material present in a polymerization reactor system when introduced to the reactor system in an effective amount.

The foregoing method applies equally well to creating modified continuity additives by modifying existing continuity additive products, e.g., commercially available or known continuity additive products or partially completed continuity additive solutions, as well as creating new continuity additives in laboratory. Thus, in the former case, the materials may be added to the carrier in any order.

To provide contextual examples, the following description will refer to the modification of an existing continuity additive product to create a new continuity additive in the form of a slurry mixture. It should be kept in mind that this is done by way of example only and is not meant to be limiting.

In a class of embodiments, the scavenger is contacted with the continuity additive slurry mixture outside of the reactor system and prior to contacting monomers and/or the catalyst system, thereby allowing time for the scavenger to neutralize water in the mixture. In one approach, the contacting is made by mixing the scavenger with the continuity additive and any additional materials in the carrier. In another approach, the contacting is performed by adding the scavenger to a premade continuity additive as it is being fed to a reaction zone.

In another class of embodiments, the scavenger is pre-contacted with the continuity additive mixture prior to contacting with the catalyst and monomer(s). The continuity additive mixture should be contacted with the scavenger for sufficient residence time to ensure the scavenger effectively neutralize catalyst poisons such as water in the continuity additive mixture and any additional materials present. Suitable methods of combining the scavenger and continuity additive mixture include blending, mixing, and other methods known in the art. Without being bound to theory, it is believed that the scavenger reacts and neutralizes any potential catalyst poison components of the continuity additive mixture.

The amount of scavenger added to the continuity additive mixture may be based on a water content in the mixture and, optionally, any additional materials therein. In one approach, the amount of water in at least the continuity additive mixture and, optionally, any additional materials therein, is measured. The amount of scavenger contacted with the continuity additive mixture may be in an amount from about 0.25 to about 5.00 mole of scavenger per mole of water measured, preferably as measured prior to addition of the scavenger thereto. In certain embodiments, the amount of scavenger contacted with the continuity additive mixture is in an amount of between about 0.50 and about 2.50 mole of scavenger per mole of water measured. In yet other embodiments, the amount of scavenger contacted with the continuity additive mixture is in an amount of between about 0.80 and about 1.50 mole of scavenger per mole of poison such as water measured. Note that higher and lower amounts of scavenger may be added in other embodiments.

In a class of embodiments, the amount of scavenger added to the continuity additive mixture is precise enough that little or no reaction occurs between the scavenger and the active substance. In one approach, less than about 30% of the continuity additive reacts with the scavenger, alternatively, less than about 15%. In certain embodiments, less than about 5% of the continuity additive reacts with the scavenger. Alternatively, less than about 2% of the continuity additive reacts with the scavenger.

In an illustrative embodiment, the continuity additive in solid form is blended with an oil-based carrier such as mineral oil to create a suspension. An amount of water in the suspension is measured and an amount of scavenger to add is calculated based on the measured amount of water. The scavenger is then blended therein.

Methods for determining water content in a suspension or slurry are well known and may be used. One approach is the Karl Fischer titration method. In general, Karl Fischer titration is based on the Bunsen reaction between iodine and sulfur dioxide in an aqueous medium:

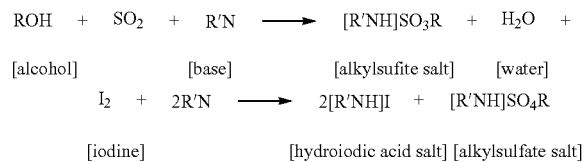

The alcohol reacts with sulfur dioxide (SO$_2$) and base to form an intermediate alkylsulfite salt, which is then oxidized by iodine to an alkylsulfate salt. This oxidation reaction reacts with water. The reactive alcohol may be methanol or 2-(2-Ethoxyethoxy)ethanol, also known as diethylene glycol monoethyl ether (DEGEE), or another suitable alcohol or chemical. Classic Karl Fisher reagents contain pyridine, a noxious carcinogen, as the base. The reagents most frequently used today are pyridine-free and contain imidazole or primary amines Generally, water and iodine react in a 1:1 ratio in the above reaction. Once all of the water is reacted, the presence of excess iodine is detected voltametrically by the titrator's indicator electrode. That signals the end-point of the titration. The amount of water present in the sample is calculated based on the concentration of iodine in the Karl Fisher titrating reagent (i.e., titer) and the amount of Karl Fisher reagent consumed in the titration.

Polymerization Process

In each of the aforementioned approaches and/or embodiments, a fluidized bed system can include a fluidized bed polymerization reactor system. Gas phase polymerization reactions may be carried out in fluidized bed polymerization reactors, and may also be formed in stirred or paddle-type reactor systems (e.g., stirred bed systems) which include solids in a gaseous environment. While the following discussion will feature fluidized bed systems, where the present invention has been found to be especially advantageous, it is to be understood that the general concepts relating to the use of continuity additives and scavengers, which are discussed relevant to the fluidized bed systems, are also adaptable to the stirred or paddle-type reactor systems as well or other system discussed herein.

A fluidized bed can generally include a bed of particles in which the static friction between the particles is disrupted. In each of the aforementioned approaches and/or embodiments, the fluidized bed system may be an open fluidized bed system or a closed fluidized bed system. An open fluidized bed system may comprise one or more fluids and one or more types of fluidized solid particles and having one or more fluidized bed surfaces that are exposed to an open uncontrolled atmosphere. For example, an open fluidized bed system can be an open container such as an open-top tank or an open well of a batch reactor or of a parallel batch reactor (e.g., microtiter chamber). Alternatively, the fluidized bed system can be a closed fluidized bed system. A closed fluidized bed system can comprise one or more fluids and one or more types of fluidized particles that are generally bounded by a barrier so that the fluids and particles are constrained. For example, a closed fluidized bed system may include a pipeline (e.g., for particle transport); a recirculating fluidized bed system, such as the fluidized bed polymerization reactor system, for example, of FIG. 4; any of which may be associated with various residential, commercial, and/or industrial applications.

A closed fluidized bed system may be in fluid communication with an open fluidized bed system. The fluid communication between a closed fluidized bed system and an open fluidized bed system can be isolatable, for example, using one or more valves. Such isolation valves can be configured for unidirectional fluid flow, such as for example, a pressure relief valve or a check valve. In general, the fluidized bed system (whether open or closed) can be defined by manufactured (e.g., man-made) boundaries comprising one or more barriers. The one or more barriers defining manufactured boundaries can generally be made from natural or non-natural materials. Also, in general, the fluidized bed system (whether open or closed) can be a flow system such as a continuous flow system or a semi-continuous flow (e.g., intermittent-flow) system, a batch system, or a semi-batch system (sometimes also referred to as a semi-continuous system). In many instances, fluidized bed systems that are flow systems are closed fluidized bed systems.

The fluidized bed is generally formed by flow of a gaseous fluid in a direction opposite gravity. The frictional drag of the gas on the solid particles overcomes the force of gravity and suspends the particles in a fluidized state referred to as a fluidized bed. To maintain a viable fluidized bed, the superficial gas velocity through the bed must exceed the minimum flow required for fluidization. Increasing the flow of the fluidizing gas increases the amount of movement of the particles in the bed, and can result in a beneficial or detrimental tumultuous mixing of the particles. Decreasing the flow results in less drag on the particles, ultimately leading to collapse of the bed. Fluidized beds formed by gases flowing in directions other than vertically include particles flowing horizontally through a pipe, particles flowing downwardly e.g., through a downcomer, etc.

Fluidized beds can also be formed by vibrating or otherwise agitating the particles. The vibration or agitation keeps the particles in a fluidized state.

Figure 4:
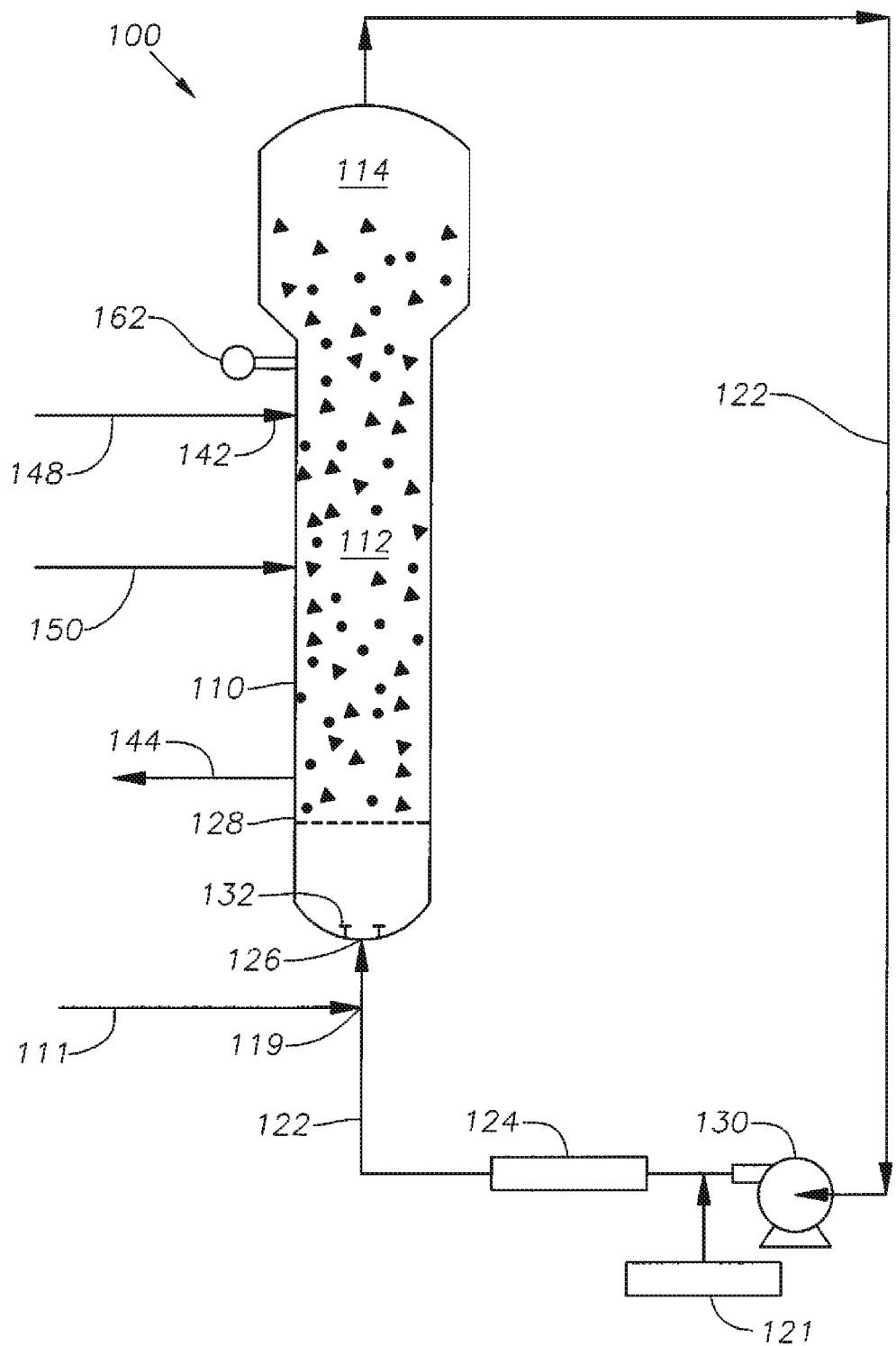
FIG. 4 is a schematic representation of the general methods, systems, and/or apparatuses of certain embodiments of the invention illustrating implementation in a gas phase polymerization reactor system.

In general terms, a conventional fluidized bed polymerization process for producing resins and other types of polymers is conducted by passing a gaseous stream containing one or more monomers continuously through a fluidized bed reactor under reactive conditions and in the presence of catalyst at a velocity sufficient to maintain the bed of solid particles in a suspended condition. A continuous cycle is employed where the cycling gas stream, otherwise known as a recycle stream or fluidizing medium, is heated in the reactor by the heat of polymerization. The hot gaseous stream, also containing unreacted gaseous monomer, is continuously withdrawn from the reactor, compressed, cooled and recycled into the reactor. Product is withdrawn from the reactor and make-up monomer is added to the system, e.g., into the recycle stream or reactor vessel, to replace the polymerized monomer. See for example U.S. Pat. Nos. 4,543,399, 4,588,790, 5,028,670, 5,317,036, 5,352,749, 5,405,922, 5,436,304, 5,453,471, 5,462,999, 5,616,661, 5,668,228, and 6,689,847. A basic, conventional fluidized bed system 100 is illustrated in FIG. 4. The reactor vessel 110 comprises a reaction zone 112 and a velocity reduction zone 114. While a reactor configuration comprising a generally cylindrical region beneath an expanded section is shown in FIG. 4, alternative configurations such as a reactor configuration comprising an entirely or partially tapered reactor may also be utilized. In such configurations, the fluidized bed can be located within a tapered reaction zone but below a region of greater cross-sectional area which serves as the velocity reduction zone of the more conventional reactor configuration shown in FIG. 4.

The reaction zone 112 includes a bed of growing polymer particles, formed polymer particles and a minor amount of catalyst all fluidized by the continuous flow of polymerizable and modifying gaseous components, including inerts, in the form of make-up feed and recycle fluid through the reaction zone. To maintain a viable fluidized bed, the superficial gas velocity through the bed must exceed the minimum flow required for fluidization which is typically from about 0.2 to about 0.5 ft/sec. for polyolefins. For example, the superficial gas velocity is at least 0.2 ft/sec above the minimum flow for fluidization or from about 0.4 to about 0.7 ft/sec. Ordinarily, the superficial gas velocity will not exceed 5.0 ft/sec and is usually no more than about 2.8 ft/sec.

On start-up, the reactor is generally charged with a bed of particulate polymer particles before gas flow is initiated. Such particles help to prevent the formation of localized "hot spots" when catalyst feed is initiated. They may be the same as the polymer to be formed or different. When different, they are preferably withdrawn with the desired newly formed polymer particles as the first product. Eventually, a fluidized bed consisting of desired polymer particles supplants the start-up bed.

Fluidization is achieved by a high rate of fluid recycle to and through the bed, typically on the order of about 50 times the rate of feed or make-up fluid. This high rate of recycle provides the requisite superficial gas velocity necessary to maintain the fluidized bed. The fluidized bed has the general appearance of dense mass of individually moving particles as created by the percolation of gas through the bed. The pressure drop through the bed is equal to or slightly greater than the weight of the bed divided by the cross-sectional area.

Referring again to FIG. 4, make-up fluids can be fed at point 119 via feed line 111 and recycle line 122. The composition of the recycle stream is typically measured by a gas analyzer 121 and the composition and amount of the make-up stream is then adjusted accordingly to maintain an essentially steady state composition within the reaction zone. The gas analyzer 121 can be positioned to receive gas from a point between the velocity reduction zone 114 and heat exchanger 124, preferably, between compressor 130 and heat exchanger 124.

To ensure complete fluidization, the recycle stream and, where desired, at least part of the make-up stream can be returned through recycle line 122 to the reactor, for example at inlet 126 below the bed. Preferably, there is a gas distributor plate 128 above the point of return to aid in fluidizing the bed uniformly and to support the solid particles prior to start-up or when the system is shut down. The stream passing upwardly through and out of the bed helps remove the heat of reaction generated by the exothermic polymerization reaction.

The portion of the gaseous stream flowing through the fluidized bed which did not react in the bed becomes the recycle stream which leaves the reaction zone 112 and passes into the velocity reduction zone 114 above the bed where a major portion of the entrained particles drop back onto the bed thereby reducing solid particle carryover.

The recycle stream is then compressed in compressor 130 and passed through heat exchanger 124 where the heat of reaction is removed from the recycle stream before it is returned to the bed. Note that the heat exchanger 124 can also be positioned before the compressor 130. An illustrative heat exchanger 124 is a shell and tube heat exchanger, with the recycle gas traveling through the tubes.

The recycle stream exiting the heat exchange zone is then returned to the reactor at its base 126 and thence to the fluidized bed through gas distributor plate 128. A fluid flow deflector 132 is preferably installed at the inlet to the reactor to prevent contained polymer particles from settling out and agglomerating into a solid mass and to maintain entrained or to re-entrain any particles or liquid which may settle out or become disentrained.

In this embodiment, polymer product is discharged from line 144. Although not shown, it is desirable to separate any fluid from the product and to return the fluid to the reactor vessel 110.

In accordance with an embodiment of the present invention, the polymerization catalyst enters the reactor in solid or liquid form at a point 142 through line 148. If one or more co-catalysts are to be added, as is often the case, the one or more cocatalysts may be introduced separately into the reaction zone where they will react with the catalyst to form the catalytically active reaction product and/or affect the reaction proceeding in the reactor system. However, the catalyst and cocatalyst(s) may be mixed prior to their introduction into the reaction zone.

A continuity additive may be added in situ to the reactor system 100 via an appropriate mechanism such as feed line 148 or another feed line 150.

Optionally, the reactor system may include sensors or probes 162 to detect static levels and changes thereof.

The reactor shown in FIG. 4 is particularly useful for forming polyolefins such as polyethylene, polypropylene, etc. Process conditions, raw materials, catalysts, etc. for forming various polyolefins and other reaction products are found in the references incorporated herein. Illustrative process conditions for polymerization reactions in general are listed below to provide general guidance.

The reaction vessel, for example, has an inner diameter of at least about 2 feet, and is generally greater than about 10 feet.

The reactor pressure in a gas phase process may vary from about 100 psig (690 kPa) to about 600 psig (4138 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C. In one approach, the reactor temperature is less than about 40° C., 30° C., more preferably less than about 20° C., and even more preferably less than about 15° C. below the melting point of the polyolefin being produced. The process can run at even higher temperatures, e.g., less than about 10° C. or 5° C. below the melting point of the polyolefin being produced. Polyethylene, for example, has a melting point in the range of approximately 125° C. to 130° C.

The overall temperature in a gas phase process typically varies from about 30° C. to about 125° C. In one approach, the temperature at the point of highest temperature in the reactor system is less than about 30° C., more preferably less than about 20° C., and even more preferably less than about 15° C. below the melting point of the polyolefin being produced. In a system such as that shown in FIG. 4, the point of highest temperature is typically at the outlet of the compressor 130.

Other gas phase processes contemplated include series or multistage polymerization processes. Also gas phase processes contemplated by the invention include those described in U.S. Pat. Nos. 5,627,242, 5,665,818 and 5,677,375, and European publications EP-A-0 794 200, EP-B1-0 649 992, EP-A-0 802 202, and EP-B-634 421.

In any of the embodiments described herein, the gas phase process may be operated in a condensed mode, where an inert condensable fluid is introduced to the process to increase the cooling capacity of the reactor system. These inert condensable fluids are referred to as induced condensing agents or ICA's. For further details of a condensed mode processes see U.S. Pat. Nos. 5,342,749 and 5,436,304.

In an embodiment, the reactor utilized in embodiments of the present invention is capable of producing greater than 500 lbs of polymer per hour (227 Kg/hr) to about 175,000 lbs/hr (80,000 Kg/hr) or higher of polymer. In exemplary embodiments, the reactor utilized is capable of producing greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

Figure 5:
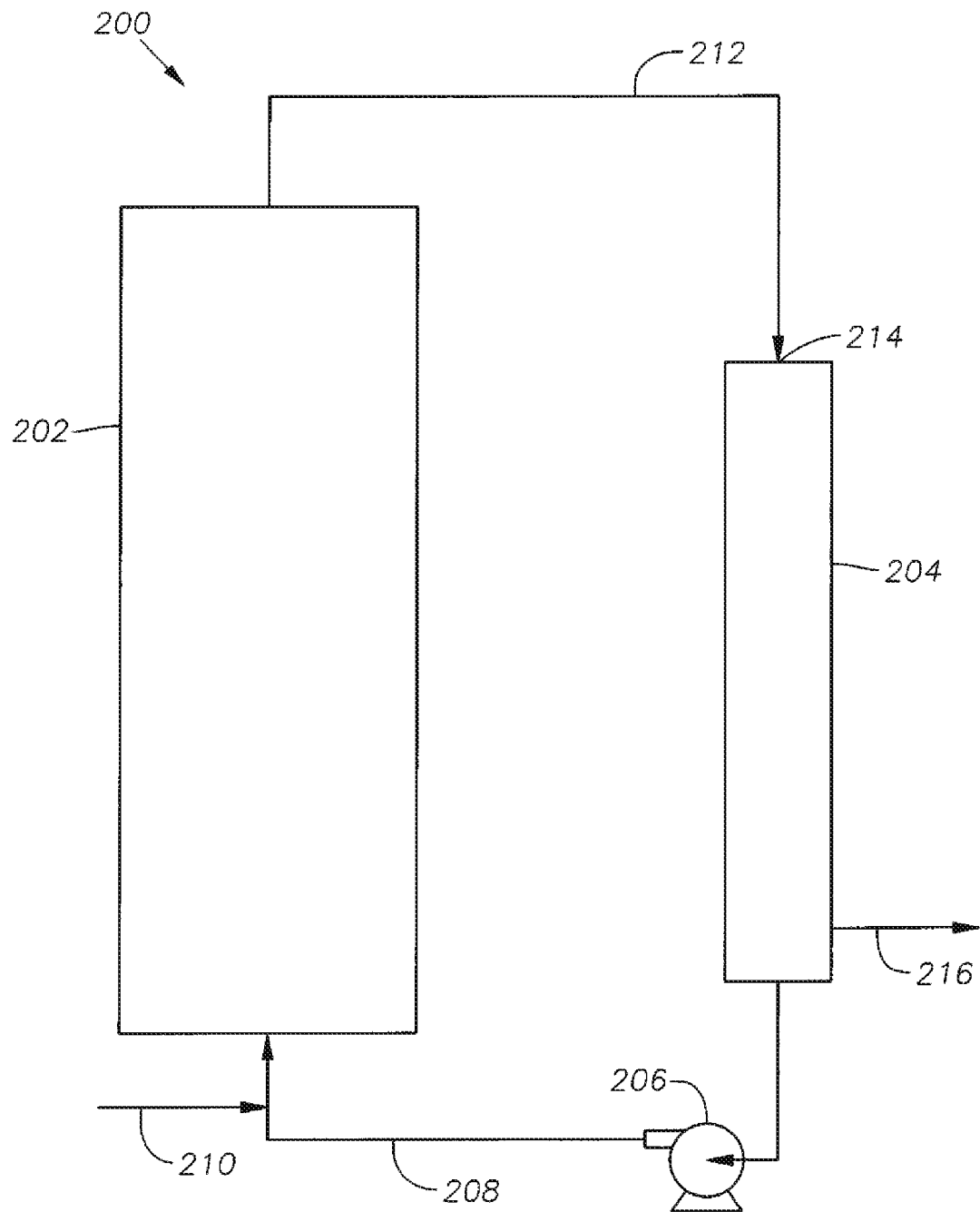
FIG. 5 is another schematic representation of the general methods, systems, and/or apparatuses of certain embodiments of the invention illustrating implementation in a gas phase polymerization reactor system.

Another illustrative fluidized bed polymerization reactor system 200 is shown in FIG. 5. As shown, the system 200 is a recirculating system including a fast riser 202, a downcomer 204, and a recirculating pump 206. The monomer(s) and catalyst are added to recycle line 208 via feed 210. In this type of system, the polymerization product is formed primarily in the fast riser 202, but continues to form throughout the system. Polymer particles formed in the fast riser 202 pass through line 212 to an upper inlet port 214 of the downcomer 204. The polymer particles gather in the downcomer, where they move downwardly in a dense, slow moving bed. The bed formed in the downcomer can be considered a fluidized bed. Particulate polymer product is discharged from line 216. Although not shown, it is desirable to separate any fluid from the product and to return the fluid to the reactor system 200.

Slower moving masses of particles, while considered "fluidized" for purposes of embodiments of the invention, are also referred to in the art as "moving beds." Moving beds include particles in such things as mass flow bins, downcomers, etc. where solids are slowly moving through a vessel.

Stirred bed system, while considered "fluidized" for purposes of embodiments of the invention, include beds stirred or otherwise agitated by a member such as a paddle or plunger rotating or moving through the bed (e.g., stirred bed reactor, blender, etc.). Other types of stirred bed systems can be formed by a rotating drum (e.g., with or without internal baffles to enhance mixing), a vessel moving in a see-saw manner, agitation including ultrasonic vibrations applied to the particles or their container, etc.

Figure 6:
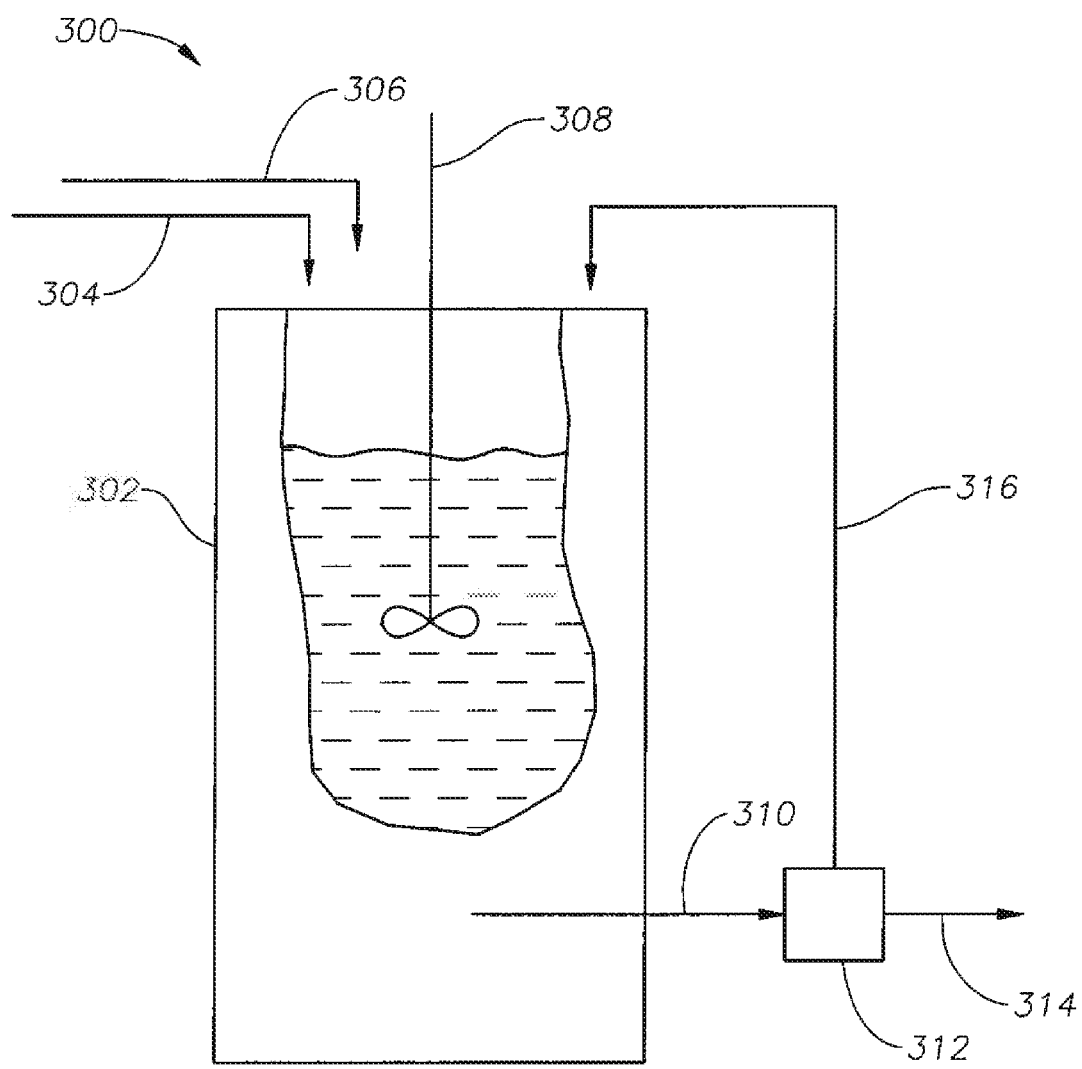
FIG. 6 is yet another schematic representation of the general methods, systems, and/or apparatuses of certain embodiments of the invention illustrating implementation in a liquid phase polymerization reactor system.

Referring to FIG. 6, a liquid phase polymerization system 300, such as a slurry, suspension or solution reactor system, according to one approach generally comprises a reactor vessel 302 to which a monomer and a catalyst composition are added, such as via feed lines 304 and 306, respectively, or as a mixture combined prior to addition to the reactor vessel 302. Additional materials can be fed to the reactor vessel 302 via feed lines 304, 306, or an additional feed line or lines. The reactor vessel 302 typically contains a liquid reaction medium for dissolving and/or suspending the polyolefin. The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization, Among the inert liquid hydrocarbons suitable for this purpose are isopentane, hexane, cyclohexane, heptane, benzene, toluene, and the like. Slurry or solution polymerization systems may utilize subatmospheric or superatmospheric pressures and temperatures in the range of about 40° C. to about 300° C. A useful liquid phase polymerization system is described in, for example, U.S. Pat. No. 3,324,095.

Reactive contact between the olefin monomer and the catalyst composition may be maintained by constant stirring or agitation, e.g., by a member such as a paddle 308 or plunger rotating or moving through the reactor vessel 302 (e.g., stirred reactor, blender, etc.). Other types of liquid phase polymerization systems can be formed by a rotating drum (e.g., with or without internal baffles to enhance mixing), a vessel moving in a see-saw manner, agitation including ultrasonic vibrations applied to the materials or vessel, etc.

The reaction medium containing the olefin polymer product and unreacted olefin monomer is withdrawn from the reactor vessel 302 continuously via outlet line 310. The olefin polymer product is separated by separator 312, and moved from the system via line 314. The unreacted olefin monomer and liquid reaction medium are recycled into the reactor vessel 302 via recycle line 316.

In general, for example, the reactor systems and methods described herein may be used in connection with liquids and/or gases having a wide range of fluid properties, such as a wide range of viscosities, densities and/or dielectric constants (each such property being considered independently or collectively as to two or more thereof). For example, liquid fluids can generally have viscosities ranging from about 0.1 cP to about 100,000 cP, and/or can have densities ranging from about 0.0005 g/cc^3 to about 20 g/cc^3 and/or can have a dielectric constant ranging from about 1 to about 100. In many embodiments of the invention, the bulk material is a gaseous fluid. Gaseous fluids can, for example, generally have viscosities ranging from about 0.001 to about 0.1 cP, and/or can have densities ranging from about 0.0005 to about 0.1 g/cc^3 and/or can have a dielectric constant ranging from about 1 to about 1.1.

The bulk material can include relatively pure gaseous elements (e.g., gaseous $N_2$, gaseous $H_2$, gaseous $O_2$). Other components can include relatively pure liquid, solid, or gaseous compounds (e.g., liquid or solid catalyst, gaseous monomer, air). The various systems of embodiments of the invention can also include single-phase or multi-phase mixtures of gases, solids and/or liquids, including for example: two-phase mixtures of solids and gases (e.g., fluidized bed systems), mixtures of gasses with a single type of particle, mixtures of gasses with different types of particles (e.g., polymer and catalyst particles); and/or three-phase mixtures of gasses, liquids and solids (e.g., fluidized bed with liquid catalyst being added). Particular examples of preferred fluids are described herein, including in discussion below regarding preferred applications of the methods and devices of embodiments of the invention.

The operating conditions of the reactor and other systems are not narrowly defined to the invention. While general operating conditions have been provided above for fluidized bed polymerization reactor systems, fluidized and nonfluidized bed systems can, in addition to those listed above, have widely varying process conditions, such as temperature, pressure, fluid flowrate, etc.

Addition of Continuity Additives

Addition of continuity additives as noted in U.S. patent application Ser. No. 11/011,421 to Hagerty et al., is a demonstration as to how to add a continuity additive to a reactor system using metallocene based catalysts. The total amount of continuity additive or additives to be present in the reactor will generally not exceed 250 or 200, or 150, or 125 or 100 or 90, or 80, or 70 or 60, or 50, or 40, or 30, or 20 or 10 ppm (parts per million by weight of polymer being produced) and/or the amount of continuity additive will be zero, or greater than 1, or 3, or 5, or 7, or 10, or 12, or 14, or 15, or 17, or 20 ppm based on the weight of polymer being produced (usually expressed as pounds or kilograms per unit of time). Any of these lower limits are combinable with any upper limit. These amounts of continuity additive contemplate one, two, three, four or more continuity additives, the total amount of one or two or more continuity additives in the reactor will be understood to be additive with the total disclosed immediately above from any source. The continuity additive can be added directly to the reactor through a dedicated feed line, and/or added to any convenient feed stream, including the monomer, e.g., ethylene feed stream, a comonomer feed stream, a catalyst feed line, or the recycle line. If more than one continuity additive is used, each one may be added to the reactor as separate feed streams, or as any combination of separate feed streams or mixtures.

It is also within the scope of embodiments of the present invention to introduce at least one continuity additive in the catalyst mixture, inject the catalyst mixture (containing at least one continuity additive) into the reactor system, and additionally or alternatively introduce at least one continuity additive into the reactor system via a dedicated continuity additive feed line independent of the catalyst mixture, so that a sufficient concentration of the at least one continuity additive is introduced into the reactor to prevent or eliminate a reactor discontinuity event. Either of these feed schemes or both together may be employed. The continuity additive in the catalyst/continuity additive mixture and the continuity additive added via the separate continuity additive feed line, may be the same or different.

If a combination of continuity additives is used, the total present in the reactor may be as noted above.

The amount of continuity additive added to the reactor system may be based on a static activity measurement, as disclosed in U.S. patent application Ser. No. 11/011,421 to Hagerty et al.

Additionally, in a class of embodiments, specific "effective amounts" of continuity additives may be employed as disclosed in U.S. patent application Ser. No. 11/011,421 to Hagerty et al.

Catalysts

All polymerization catalysts including conventional transition metal catalysts and metallocene catalysts or combinations thereof, are suitable for use in embodiments of the processes of the present invention. Also contemplated are catalysts such as AlCl$_3$, cobalt, iron, palladium, chromium/chromium oxide or "Phillips" catalysts. Bimodal catalysts are also contemplated. The following is a non-limiting discussion of various useful polymerization catalysts.

As used herein, the phrase "catalyst system" includes at least one "catalyst component" and at least one "activator", alternatively, at least one co-catalyst. The catalyst system may also include other components, such as supports, and is not limited to the catalyst component and/or activator alone or in combination. The catalyst system may include any number of catalyst components in any combination as described herein, as well as any activator in any combination as described herein.

As used herein, the phrase "catalyst compound" includes any compound that, once appropriately activated, is capable of catalyzing the polymerization or oligomerization of olefins, the catalyst compound comprising at least one Group 3 to Group 12 atom, at least one ligand, and optionally at least one leaving group bound thereto.

As used herein, the phrase "leaving group" refers to one or more chemical moieties bound to the metal center of the catalyst component that can be abstracted from the catalyst component by an activator or co-catalyst, thus, producing the species active towards olefin polymerization or oligomerization. The activator is described further below.

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

As used herein, a "hydrocarbyl" includes aliphatic, cyclic, olefinic, acetylenic and aromatic radicals (i.e., hydrocarbon radicals) comprising hydrogen and carbon that are deficient by one hydrogen. A "hydrocarbylene" is deficient by two hydrogens.

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms selected from the group consisting of boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, and thioethers.

As used herein, "heterocyclic" refers to ring systems having a carbon backbone that comprise from 1 to 3 atoms selected from the group consisting of boron, aluminum, silicon, germanium, nitrogen, phosphorous, oxygen and sulfur, unless the heteroatom (non carbon atom) is described.

As used herein, an "alkylcarboxylate", "arylcarboxylate", and "alkylarylcarboxylate" is an alkyl, aryl, and alkylaryl, respectively, that possesses a carboxyl group in any position. Examples include $C_6H_5CH_2C(O)O^-$, $CH_3C(O)O^-$, etc.

As used herein, the term "substituted" means that the group following that term possesses at least one moiety in place of one or more hydrogens in any position, the moieties selected from such groups as halogen radicals (for example, Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

Unless stated otherwise, no embodiment of the present invention is herein limited to the oxidation state of the metal atom "M" as defined below in the individual descriptions and examples that follow.

The catalyst system useful in embodiments of the present invention include at least one metallocene catalyst component as described herein. Metallocene catalyst compounds are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243-296 (1999) and in particular, for use in the synthesis of polyethylene in 1 METALLOCENE-BASED POLYOLEFINS 261-377 (2000). The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components". The metallocene catalyst component may be supported on a support material in an embodiment, and may be supported with or without another catalyst component.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, or the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Or the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno [1,2-9]anthrene, thiophenoindenyl, thiophenofluorenyl, hydrogenated versions thereof (e.g., 4,5,6,7-tetrahydroindenyl, or "$H_4Ind$"), substituted versions thereof, and heterocyclic versions thereof.

Group 15-Containing Catalyst Component

One aspect of the present invention includes the use of so called "Group 15-containing" catalyst components as described herein as a desirable catalyst component, either alone or for use with a metallocene or other olefin polymerization catalyst component. Generally, "Group 15-containing catalyst components", as referred to herein, include Group 3 to Group 12 metal complexes, wherein the metal is 2 to 8 coordinate, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing compounds are disclosed in, for example, WO 99/01460; EP A1 0 893 454; EP A1 0 894 005; U.S. Pat. No. 5,318,935; U.S. Pat. No. 5,889,128 U.S. Pat. No. 6,333,389 B2 and U.S. Pat. No. 6,271,325 B1.

In one embodiment, the Group 15-containing catalyst components useful in embodiments of the present invention include Group 4 imino-phenol complexes, Group 4 bis(amide) complexes, and Group 4 pyridyl-amide complexes that are active towards olefin polymerization to any extent.

Activator

As used herein, the term "activator" or "co-catalyst" is defined to be any compound or combination of compounds, supported or unsupported, which can activate a single-site catalyst compound (e.g., metallocenes, Group 15-containing catalysts), such as by creating a cationic species from the catalyst component. Typically, this involves the abstraction of at least one leaving group (X group in the formulas/structures above) from the metal center of the catalyst component. The catalyst components of embodiments of the present invention are thus activated towards olefin polymerization using such activators. Embodiments of such activators include Lewis acids such as cyclic or oligomeric poly(hydrocarbylaluminum oxides) and so called non-coordinating activators ("NCA") (alternately, "ionizing activators" or "stoichiometric activators"), or any other compound that can convert a neutral metallocene catalyst component to a metallocene cationic species that is active with respect to olefin polymerization.

It is within the scope of the various embodiments of the present invention to use Lewis acids such as alumoxane (e.g., "MAO"), modified alumoxane (e.g., "TIBAO"), and alkylaluminum compounds as activators, and/or ionizing activators (neutral or ionic) such as tri (n-butyl)ammonium tetrakis (pentafluorophenyl)boron and/or a trisperfluorophenyl boron metalloid precursors to activate metallocenes described herein. MAO and other aluminum-based activators are well known in the art. Ionizing activators are well known in the art and are described by, for example, Eugene You-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391-1434 (2000). The activators may be associated with or bound to a support, either in association with the catalyst component (e.g., metallocene) or separate from the catalyst component, such as described by Gregory G. Hlatky, *Heterogeneous Single-Site Catalysts for Olefin Polymerization* 100(4) CHEMICAL REVIEWS 1347-1374 (2000).

Ziegler-Natta Catalyst

The catalyst composition may comprise a catalyst component, which is (or includes) a non-metallocene compound. In an embodiment, the catalyst component comprises a Ziegler-Natta catalyst compound, such as disclosed in ZIEGLER CATALYSTS 363-386 (G. Fink, R. Mulhaupt and H. H. Brintzinger, eds., Springer-Verlag 1995); or in EP 103 120; EP 102 503; EP 0 231 102; EP 0 703 246; RE 33,683; U.S. Pat. No. 4,302,565; U.S. Pat. No. 5,518,973; U.S. Pat. No. 5,525,678; U.S. Pat. No. 5,288,933; U.S. Pat. No. 5,290,745; U.S. Pat. No. 5,093,415 and U.S. Pat. No. 6,562,905. Examples of such catalysts include those comprising Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Conventional-type transition metal catalysts are those traditional Ziegler-Natta catalysts that are well known in the art. Examples of conventional-type transition metal catalysts are discussed in U.S. Pat. Nos. 4,115,639, 4,077,904, 4,482,687, 4,564,605, 4,721,763, 4,879,359 and 4,960,741. The conventional-type transition metal catalyst compounds that may be used in embodiments of the present invention include transition metal compounds from Groups 3 to 17, or Groups 4 to 12, or Groups 4 to 6 of the Periodic Table of Elements.

These conventional-type transition metal catalysts may be represented by the formula: $MR_x$, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot 1/3AlCl_3$ and $Ti(OC_{12}H_{25})Cl_3$.

Conventional-type transition metal catalyst compounds based on magnesium/titanium electron-donor complexes that are useful in embodiments of the invention are described in, for example, U.S. Pat. Nos. 4,302,565 and 4,302,566. Catalysts derived from Mg/Ti/Cl/THF are also contemplated, which are well known to those of ordinary skill in the art. One example of the general method of preparation of such a catalyst includes the following: dissolve TiCl$_4$ in THF, reduce the compound to TiCl$_3$ using Mg, add MgCl$_2$, and remove the solvent.

Conventional-type cocatalyst compounds for the above conventional-type transition metal catalyst compounds may be represented by the formula M$^3$M$^4{}_v$X$^2{}_c$R$^3{}_{b-c}$, wherein M$^3$ is a metal from Group 1 to 3 and 12 to 13 of the Periodic Table of Elements; M$^4$ is a metal of Group 1 of the Periodic Table of Elements; v is a number from 0 to 1; each X$^2$ is any halogen; c is a number from 0 to 3; each R$^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula M$^3$R$^3{}_k$, where M$^3$ is a Group IA, IIA, IIB or IIIA metal, such as lithium, sodium, beryllium, barium, boron, aluminum, zinc, cadmium, and gallium; k equals 1, 2 or 3 depending upon the valency of M$^3$ which valency in turn normally depends upon the particular Group to which M$^3$ belongs; and each R$^3$ may be any monovalent radical that include hydrocarbon radicals and hydrocarbon radicals containing a Group 13 to 16 element like fluoride, aluminum or oxygen or a combination thereof.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description of how to make and use the compounds of the invention, and are not intended to limit the scope of that which the inventors regard as their invention.

The polymerization reactions described in the following examples were conducted in a continuous pilot-scale gas phase fluidized bed reactor of 0.35 meters internal diameter and 2.3 meters in bed height. The fluidized bed was made up of polymer granules. The gaseous feed streams of ethylene and hydrogen together with liquid comonomer were introduced below the reactor bed into the recycle gas line. Hexene was used as comonomer. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen to ethylene mole ratio. The concentrations of all the gases were measured by an on-line gas chromatograph to ensure relatively constant composition in the recycle gas stream.

The solid catalyst was injected directly into the fluidized bed using purified nitrogen as a carrier. Its rate was adjusted to maintain a constant production rate. The reacting bed of growing polymer particles was maintained in a fluidized state by the continuous flow of the make up feed and recycle gas through the reaction zone. A superficial gas velocity of 0.6-0.9 meters/sec was used to achieve this. The reactor was operated at a total pressure of 2240 kPa. The reactor was operated at a constant reaction temperature of 85° C.

The fluidized bed was maintained at a constant height (2.3 meters) by withdrawing a portion of the bed at a rate equal to the rate of formation of particulate product. The rate of product formation (the polymer production rate) was in the range of 15-25 kg/hour. The product was removed semi-continuously via a series of valves into a fixed volume chamber. This product was purged to remove entrained hydrocarbons and treated with a small steam of humidified nitrogen to deactivate any trace quantities of residual catalyst.

FIG. 4 is representative of the pilot-scale fluidized bed reactor system used in these examples.

Preparation of the Continuity Additive Mixture with Scavenger

The moisture level of a slurry continuity additive comprising aluminum distearate in a mineral oil carrier was measured using the Karl Fischer method discussed above. Then, 1.25 mole of triethyl aluminum (TEAl) as the scavenger was added to the slurry per mole of water in the slurry to scavenge the residual moisture. The continuity additive was then metered to a reactor system performing a gas phase fluidized bed polyethylene polymerization process using XCAT EZ 100 metallocene catalyst. The continuity additive was added separately from the catalyst. The continuity additive mixture was fed to the reaction system based on the rate of polymer produced per hour.

Reactor Operation

The solid catalyst was injected directly into the fluidized bed using purified nitrogen as a carrier. Its rate was adjusted to maintain a constant production rate. The reacting bed of growing polymer particles was maintained in a fluidized state by the continuous flow of the make up feed and recycle gas through the reaction zone. A superficial gas velocity of 0.6-0.9 meters/sec was used to achieve this. The reactor was operated at a total pressure of 2240 kPa. The reactor was operated at a constant reaction temperature of 85° C.

Example 1

The polymerization reactor mentioned above was operated the following reaction conditions to produce a film product of about 0.8 to 1.3 melt index and 0.920 density product at the following reaction conditions using metallocene catalyst (XCAT EZ 100): reaction temperature of 85° C., hexene-to-ethylene molar ratio of 0.009 and H2 concentration of 791 ppm. The continuity additive slurry in mineral oil was metered to the reactor at a rate based on polymer production rate. The continuity additive concentration in polymer averaged about 53 ppmw. The reactor operated smoothly and the catalyst productivity averaged 4191 gram polymer per gram catalyst.

Example 2

In this example the reactor was operated at similar conditions as in example 1 except for feeding continuity additive mixture pre-treated with a scavenger (TEAl). The continuity additive/scavenger mixture was prepared as mentioned above. The pre-treated continuity additive was metered to the reactor similar to example. The continuity additive concentration in the polymer averaged about 49.6 ppmw. The reactor operated smoothly and the catalyst productivity averaged 5217 gram polymer per gram catalyst.

Example 3

In this example the reactor was operated at similar conditions as in example 2 except for feeding lower level of pre-treated continuity additive. The pre-treated continuity additive concentration in the polymer averaged about 26 ppmw.

The reactor operated smoothly and the catalyst productivity increased to 5566 gram polymer per gram catalyst.

The chart of FIG. 7 illustrates the operability trends during these polymerizations. The results show that the alkyl titrated additive is as effective in mitigating sheeting as the un-titrated sample. As shown, catalyst productivity dropped significantly upon addition of the untitrated continuity additive.

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A continuity additive, comprising the contact product of:
    a substance having an ability to reduce, mitigate, or prevent at least one of fouling, sheeting, and static level of a material present in a polymerization reactor system when added to the reactor system in an effective amount, with the proviso that the substance is not a polysulfone polymer, a polymeric polyamine, or an oil-soluble sulfonic acid; and
    a scavenger contacted with the substance, wherein the scavenger is present in an amount of from about 0.25 to about 5.00 mole of scavenger per mole of water in the continuity additive;
    wherein the substance and scavenger are contacted with one another outside of a polymerization reactor to form the continuity additive; and
    wherein the continuity additive, in a polymerization reaction, increases the productivity of a catalyst or catalyst system by at least 20%, as compared to a catalyst or catalyst system under similar conditions in the presence of a continuity additive that has not been contacted with the scavenger as claimed herein.

2. The continuity additive of claim 1, wherein the substance comprises at least one of an aluminum stearate or aluminium distearate.

3. The continuity additive of claim 1, wherein the scavenger comprises a Group 12 or Group 13 element.

4. The continuity additive of claim 1, wherein the scavenger comprises at least one aluminum alkyl or triethyl aluminum.

5. The continuity additive of claim 1, wherein little or no reaction occurs between the scavenger and substance upon contacting the scavenger and the substance.

6. A continuity additive, comprising the contact product of:
    a substance having an ability to reduce, mitigate or prevent at least one of fouling, sheeting, and static level of a material present in a polymerization reactor system when added to the reactor system in an effective amount; and
    a scavenger contacted with the substance, the scavenger neutralizing water coming in contact therewith,
    wherein the scavenger is present in an amount of between about 0.25 and about 1.50 mole of scavenger per mole of water in the continuity additive;
    wherein the substance and scavenger are contacted with one another outside of a polymerization reactor to form the continuity additive; and
    wherein the continuity additive, in a polymerization reaction, increases the productivity of a catalyst or catalyst system by at least 20%, as compared to a catalyst or catalyst system under similar conditions in the presence of a continuity additive that has not been contacted with the scavenger as claimed herein.

7. The continuity additive of claim 6, wherein the substance comprises at least one of an aluminum stearate or aluminum distearate.

8. The continuity additive of claim 6, wherein the scavenger comprises a Group 12 or Group 13 element.

9. The continuity additive of claim 6, wherein the scavenger comprises at least one of an aluminum alkyl or triethyl aluminum.

10. The continuity additive of claim 6, wherein little or no reaction occurs between the scavenger and substance upon contacting the scavenger and the substance.

11. A method for making a continuity additive, the method comprising:
    contacting a scavenger, a substantially nonaqueous carrier, and a substance having an ability to reduce, mitigate or prevent at least one of fouling, sheeting, and static level of a material present in a polymerization reactor system when added to the reactor system in an effective amount;
    measuring an amount of water in at least the carrier, wherein the amount of the scavenger contacted with the carrier is in an amount of between about 0.25 and about 5.00 mole of scavenger per mole of water measured;
    wherein the substance is not a polysulfone polymer, a polymeric amine, or an oil soluble sulfonic acid;
    wherein the substance, substantially nonaqueous carrier, and scavenger are contacted with one another outside of a polymerization reactor to form the continuity additive; and
    wherein the continuity additive, in a polymerization reaction, increases the productivity of a catalyst or catalyst system by at least 20%, as compared to a catalyst or catalyst system under similar conditions in the presence of a continuity additive that has not been contacted with the scavenger as claimed herein.

12. The method as recited in claim 11, wherein the substance comprises at least one of an aluminum stearate or aluminum distearate.

13. The method of claim 11, wherein the scavenger comprises a Group 12 or Group 13 element.

14. The method of claim 11, wherein the scavenger comprises an aluminum alkyl.

15. The method of claim 11, wherein little or no reaction occurs between the scavenger and substance upon contacting the scavenger and the substance.

16. A polymerization process, the process comprising contacting under polymerization conditions in a reactor system:
   a catalyst system;
   one or more monomers; and
   at least one continuity additive;
   wherein the continuity additive is introduced to the reactor system independently of the catalyst system;
   wherein the continuity additive comprises a scavenger and wherein the scavenger is present in an amount of between about 0.25 and about 5.00 mole of scavenger per mole of water in the continuity additive;
   with the proviso that the continuity additive does not include an effective amount of a polysulfone polymer, a polymeric polyamine, or an oil-soluble sulfonic acid;
   wherein the scavenger is pre-contacted with the continuity additive outside of the polymerization reactor; and
   wherein the continuity additive increases the productivity of the catalyst system by at least 20%, as compared to a catalyst system under similar conditions in the presence of a continuity additive that has not been contacted with the scavenger as claimed herein.

17. The process as recited in claim 16, wherein the catalyst system comprises a metallocene catalyst.

18. The process of claim 16, wherein the continuity additive is introduced to the reactor system independently of the catalyst system.

19. The process of claim 16, wherein the one or more monomers comprises ethylene and optionally, hexene and/or butene.

20. The process of claim 16, wherein the reactor system comprises a fluidized bed.

21. The process of claim 16, wherein the continuity additive comprises an aluminum stearate.

22. The process of claim 16, wherein the scavenger comprises a Group 12 or Group 13 element.

23. The process of claim 16, wherein the scavenger comprises an aluminum alkyl.

24. A process for introducing at least one continuity additive into a reactor system in an amount that reduces, prevents, or mitigates sheeting or fouling of polymer produced by a polymerization reaction of at least one olefin, wherein the polymerization reaction is conducted in the reactor system, the reactor system comprising a fluidized bed reactor, an entrainment zone, a catalyst feed for introducing a catalyst system, at least one continuity additive feed for introducing the at least one continuity additive independently of the catalyst mixture, a mechanism for monitoring a level of electrostatic activity in the reactor system, the process comprising:
   contacting the at least one olefin with the catalyst system under polymerization conditions in the fluidized bed reactor;
   introducing the at least one continuity additive into the reactor system at a time before, during, or after start of the polymerization reaction, wherein the continuity additive includes a scavenger and wherein the scavenger is present in an amount of between about 0.25 and about 5.00 mole of scavenger per mole of water in the continuity additive, wherein the scavenger is pre-contacted with the continuity additive outside of a polymerization reactor;
   monitoring the levels of electrostatic activity in the entrainment zone;
   adjusting the amount of the at least one continuity additive introduced into the reactor system to maintain the level of electrostatic activity in the reactor system at or below a predetermined level; and
   wherein the continuity additive increases the productivity of the catalyst system by at least 20%, as compared to a catalyst system under similar conditions in the presence of a continuity additive that has not been contacted with the scavenger as claimed herein.

25. The process of claim 24, wherein the catalyst system comprises a metallocene and/or a conventional transition metal catalyst.

26. The process of claim 24, wherein the process comprises a gas phase process.

27. The process of claim 24, wherein the polymer is produced continuously.

28. The process of claim 24, wherein the at least one olefin comprises ethylene or ethylene and hexene and/or butene.

* * * * *